INVENTOR
ERIC METCALF
HOWARD ANTHONY DOREY
BY Michael P. Breston

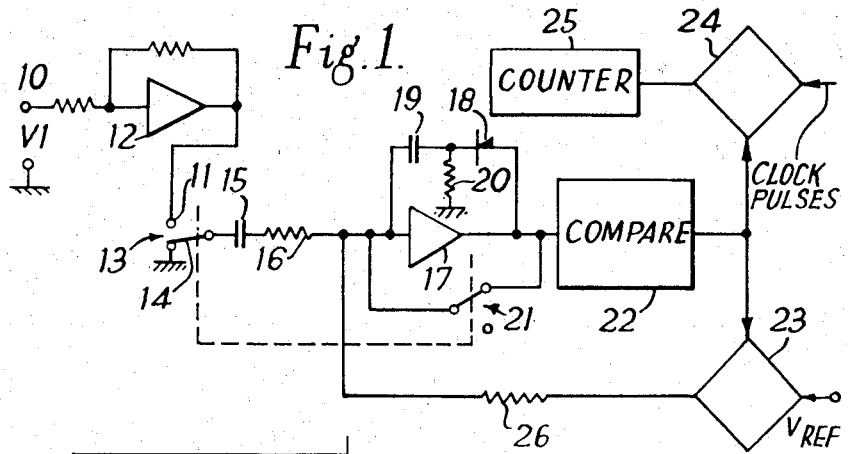
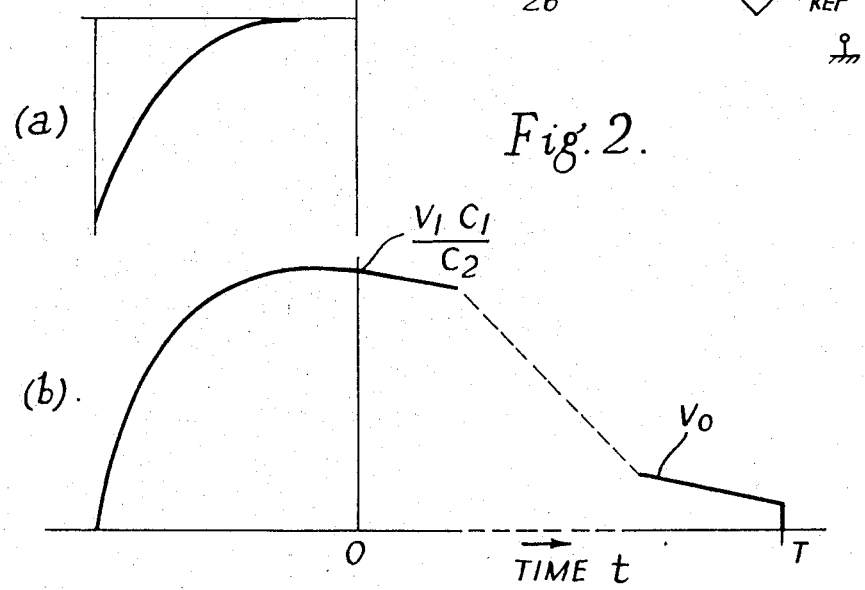
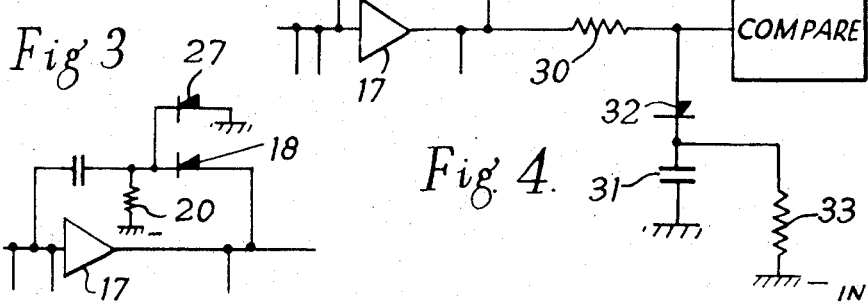

ATTORNEY

United States Patent Office 3,439,271
Patented Apr. 15, 1969

3,439,271
DIGITAL VOLTMETERS INCLUDING AMPLIFIER WITH CAPACITIVE FEEDBACK
Eric Metcalf and Howard Anthony Dorey, Farnborough, England, assignors to The Solartron Electronic Group Limited, Farnborough, England, a British company
Filed Apr. 21, 1965, Ser. No. 449,809
Claims priority, application Great Britain, Apr. 23, 1964, 16,922/64
Int. Cl. G01r 17/06
U.S. Cl. 324—99                     22 Claims

ABSTRACT OF THE DISCLOSURE

A digital voltmeter including an operational amplifier and a feedback network including a capacitor connected between the output and input of the amplifier. Circuitry is provided to feed a charge proportional to the voltage to be measured into the amplifier to charge the capacitor. A reference current circuit supplies a reference current to the amplifier during a measuring interval in which a comparator circuit connected to the output of the amplifier causes clock pulses to be counted. The reference current discharges the capacitor and the comparator terminates the counting of clock pulses when the amplifier output returns to virtual earth. Since both the measured and reference currents pass through the same amplifier, its linearity is not controlling in the accuracy of the instrument.

---

Figure 5:
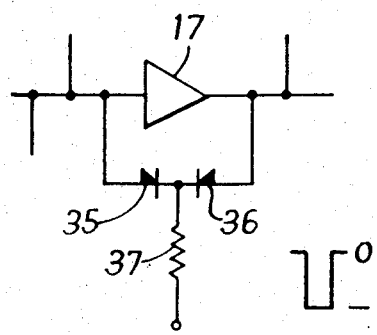

This invention relates to digital voltmeters, that is to say voltmeters which incorporate a counter in which a measure of the applied voltage is obtained as an integral number. In practice the counter may be binary, binary coded decimal or decimal and may give a visual display, command a printer or act as a direct source of coded information to a computer. It will be understood that, although the term voltmeter is used as is customary because instruments of the type in question are most commonly used to measure potential, the instruments may of course also be applied to the measurement of current, charge or other related quantities.

The present invention concerns digital voltmeters in which a capacitor is charged to a value dependent upon the voltage to be measured and then discharged at a predetermined rate, the time taken for the capacitor to discharge being a measure of the value of the applied voltage. Such voltmeters will be referred to as of the type specified.

Digital voltmeters have been proposed wherein a ramp voltage acts in opposition to the applied voltage and wherein clock pulses are counted from the commencement of the ramp until a comparator circuit indicates that the ramp voltage corresponds to the applied voltage, the pulse count accordingly being a measure of the value of the applied voltage. Such voltmeters are known as ramp-compare voltmeters.

Such voltmeters have depended for their accuracy on the linearity of the ramp voltage. Since high-linearity ramp generators are expensive this type of voltmeter has as a practical matter been restricted to instruments of moderate precision only, say 1% or at best 0.1%. A voltmeter of the type specified is similar to a ramp-compare voltmeter in that the output waveform of the former is also a ramp voltage during whose continuance time is measured until the ramp arrives at a predetermined level. However, the object of this invention is to provide an improved voltmeter of the type specified in which accuracy does not depend on linearity and may be attained without sacrificing simplicity.

According to the invention there is provided a digital voltmeter comprising an operational amplifier having capacitive feedback and having its output connected to a comparator circuit, means for initially feeding into the amplifier a charge proportional to the voltage to be measured and means for subsequently applying a reference current to the amplifier input during a measuring interval in which the comparator circuit causes clock pulses to be counted until the amplifier output returns to virtual earth.

The capacitor which is charged and discharged is thus the feedback capacitor of the amplifier.

An operational amplifier is a high gain D.C. amplifier with a lot of feedback on account of which its input preserves a virtual earth. How high the gain must be and how much feedback is required depend upon the overall accuracy required. An operational amplifier with the appropriate feedback can also have a suitably low output impedance. Because both the charging current determined by the voltage to be measured and the reference current pass through the same amplifier, its linearity and zero error are not controlling factors in the accuracy of the measurement. The virtual earth does not therefore have to be precisely at zero reference volts. Drift on the other hand can affect the results but stability is only required over the interval required to complete a measurement.

One source of inaccuracy in ramp type digital voltmeters lies in the difficulty of determining precisely by means of the comparator circuit when the ramp output voltage returns to datum level. This difficulty is overcome in a development of the invention which leads to a very rapid change in voltage at the end of the ramp, whereby the comparator circuit is caused to respond rapidly with substantially no uncertainty as to time.

This is achieved by connecting the output of the amplifier to a current sink through a unidirectional switch which is included in the feedback path between the amplifier output and the capacitor. Because of the very low effective output impedance of the operational amplifier the current flowing to the sink can be disregarded. During the initial charging interval the charging current and sink current flow additively through the switch in the forward direction. The reference current which then discharges the capacitor subtracts from the sink current which, however, keeps the switch open until the capacitor is substantially discharged. The switch then closes because there is insufficient potential across it and the feedback path is broken. The amplifier output voltage swings violently in the direction in which it has been moving steadily during the discharge ramp and the comparator circuit indicates the end of the ramp substantially instantaneously.

Two main ways are proposed for feeding the initial charge into the amplifier. One is to charge a series input capacitor from the voltage to be measured. The other way is to use a differential amplifier. One input is connected to the voltage to be measured. The other input has a summing junction to which are connected a capacitor (corresponding to the aforesaid series capacitor and connected on the other side to earth), the feedback capacitor and the reference voltage.

Figure 6:
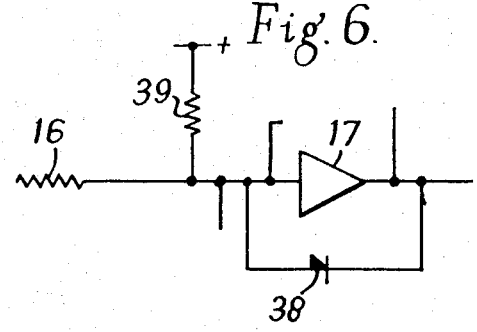
Figure 7:
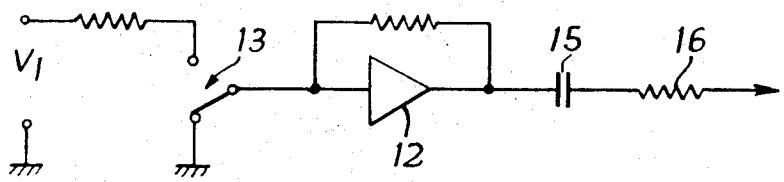
Figure 8:
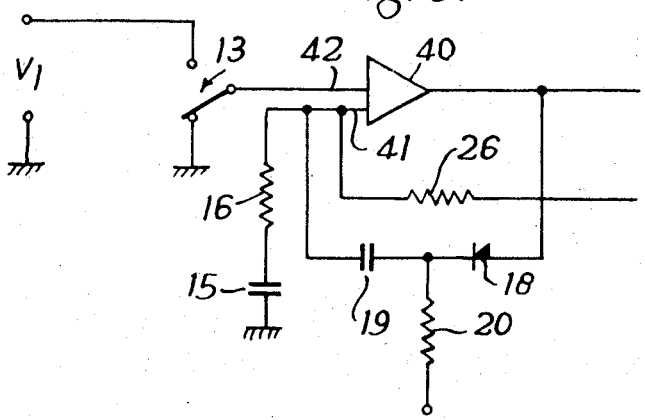

The invention will be described in more detail by way of example with reference to the accompanying drawings, in which:

FIG. 1 is a circuit diagram of one embodiment,
FIG. 2 shows explanatory waveforms,
FIGS. 3 to 7 are partial circuit diagrams illustrating a number of modifications, and
FIG. 8 is a circuit diagram of another embodiment employing a differential amplifier.

Referring to FIG. 1, the voltage $V_1$ to be measured is applied between terminal 10 and earth. The terminal 10 is connected to a fixed switch contact 11 through a feedback amplifier 12. The switch 13 has another fixed contact which is earthed and a changeover contact 14 connected through a series capacitor 15 and protective resistor 16 to the input of an operational amplifier 17. The amplifier has a feedback path through a rectifier 18 and capacitor 19 the junction of the rectifier and capacitor being connected to earth through a resistor 20 which is of low value, say 100 ohms.

When the circuit is in the quiescent condition, as shown, the amplifier output is shorted to virtual earth by a switch 21 whose movable contact is ganged to the contact 14. When the amplifier output is at virtual earth (or is negative) a comparator 22, which may be a bistable trigger circuit keeps two gates 23 and 24 closed.

When a measurement is made, the switches 13 and 21 are changed over and the capacitor 15 charges. The amplifier 12 is not essential but is provided because the charging current may be heavy. The capacitor 15 discharges into the virtual earth through the protective resistor 16 with a time constant determined by the capacitor and resistor. This time constant must clearly be small compared with the time taken to complete the measurement.

Considering this operation in more detail, FIG. 2(a) shows the voltage on the right hand side of capacitor 15 whose value will be represented as $C_1$. A current of like waveform flows through resistor 16 of value $R_1$, the expression for the current being $$i_1 = \frac{V_1}{R_1} e^{-(t/C_1 R_1)}$$

Because of the properties of operational amplifiers this same current flows through the feedback circuit and accordingly the right hand side of the capacitor 19 acquires a voltage $V_2$ where $$V_2 = -\frac{1}{C_2} \int_0^t i_1 dt = \frac{V_1 C_1}{C_2} (1 - e^{-(t/C_1 R_1)})$$

This voltage is indicated at (b) in FIG. 2 and rises rapidly to $$\frac{V_1 C_1}{C_2}$$

It should be noted that FIG. 2 has a very much expanded time scale which has necessitated suppression of the major part of the ramp in FIG. 2(b). Assuming that $V_2$ is of the order of 5 volts it will be seen that a heavy current (50 ma.) flows to earth through resistor 20. This does not affect the operation of the meter as already explained.

The positive amplifier output potential now triggers the comparator 22 which opens gates 23 and 24 at what will be taken as zero time, from which time is measured by a counter 25 to which clock pulses now pass through the gate 24. At the same time an accurately determined negative reference current flows into the amplifier 17 from a voltage source $V_{REF}$ through the gate 23 and a precision resistor 26 of value $R_2$. Again an equal current flows in the feedback circuit, discharging capacitor 19. This current has to flow in the reverse direction through the rectifier 18 which is however kept open by the much heavier current flowing to earth through resistor 20.

The potential of the capacitor 19 falls linearly at a rate $$\frac{V_{REF}}{C_2 R_2}$$

so that the potential $V_0$ is given by $$\frac{V_1 C_1}{C_2} - t \frac{V_{REF}}{C_2 R_2}$$

where $t$ is time. Theoretically the end of the ramp should be reached when $V_0$ is back to zero, giving $$V_1 = \frac{T V_{REF}}{C_1 R_2}$$

where T is the time at the end of the ramp, when the gates 23 and 24 close. $V_1$ is accordingly given in terms of a reference voltage, a capacitance and resistance and a time measured by the clock pulse counter 25. Actually the feedback path will close when $V_0/R_3 = V_{REF}/R_2$ where $R_3$ is the value of resistor 20. $V_{REF}/R_2$ may be 100μα. for example, giving a terminal value of $V_0 = 10$ mv. A correction therefore has to be added to the value of $V_1$ given above, namely $$V_{REF} \frac{R_3}{R_2} \frac{C_1}{C_2}$$

This is a small constant correction which can be allowed for in the calibration of the instrument.

As illustrated at time T in FIG. 2(b) the ramp is terminated by $V_0$ rushing negative because the feedback path has closed and the amplifier external gain has become extremely high.

As described the meter measures a negative voltage $V_1$. In order to measure a positive voltage it is merely necessary to invert the phase of operation of switch 13 with respect to switch 21.

A possible disadvantage of the arrangement just described is the heavy current drawn to earth from the amplifier output. FIG. 3 shows a simple modification in which the resistor 20 is taken to a more negative potential and a further rectifier 27 is connected to earth. The current through resistor 20 now need only be sufficient to exceed the reference current which flows through resistor 26 and sufficient to give a sharp changeover at the end of the ramp. In practice 5 ma. is sufficient. The rectifier in FIG. 1 and each rectifier in FIG. 3 is preferably a silicon diode which is substantially non-conducting with zero volts across it.

In describing FIG. 1 it was assumed that the time constant $C_1 R_1$ was sufficiently short for the capacitor 19 to charge completely before the circuit 22 operated. It may be necessary to delay the operation of the circuit 22 and this can be done with the modification illustrated in FIG. 4. Here a series resistor 30 and shunt capacitor 31 introduce the delay during the rising part of the waveform of FIG. 2(b). During the ramp stroke a diode 32 in series with the capacitor is non-conducting and so switches out the delay circuit. A high value resistor 33 then discharges the capacitor 31.

Instead of a delay circuit, a switch or gate inserted between the amplifier 17 and comparator circuit 22 may be used to impart a delay, the switch or gate being operated at a suitable interval after the switches 13 and 21. The timing is preferably interlocked with the clock pulses to remove a source of possible jitter.

Clearly either of the switches 13 and 21 may take any suitable form including a manual switch, an electromechanical switch, an electronic switch such as a transistor or an arrangement of photo-diodes operated by a switched light source. As one example of an electronic switch arrangement, FIGURE 5 shows a pair of diodes 35 and 36 connected back to back across the amplifier 17, a switch pulse applied to the junction of the diodes through a resistor 37 causing them alternately to conduct and block. The switch across the amplifier 17 need not, however, be positively operated at all, since a single diode 38 connected as shown in FIGURE 6 will, with the polarities already assumed, operate automatically by virtue of the rise and fall of the amplified voltage. It will be appreciated, moreover, that this automatically enables the meter to be used with input voltages of either polarity.

FIGURE 6 also illustrates another modification wherein the input of the amplifier 17 is additionally connected to a source of positive potential through a high resistance 39. This defines the level of the amplifier more precisely which is particularly desirable if the amplifier has a transistor input switch. Also in the circuit shown in FIGURE 6 it ensures good conduction of the diode 38. Naturally the current conducted by the resistor 39 adds to the reference current flowing through the resistor 26 and because the current through resistor 39 is not switched, the ramp must be started immediately on charging the capacitor 19. In other words it is no longer possible to introduce an indeterminate delay as suggested in connection with FIGURE 4 of the drawings. Clearly, the current flowing through resistor 39 must be allowed for in the calibration of the instrument.

The meter operates entirely upon a difference of voltages at its switched input. It is therefore possible to make the amplifier 12 an A.C. amplifier provided the switch 13 is transferred from the output of the amplifier to its input as illustrated in FIGURE 7. The amplifier 12 can accordingly be of unspecified zero level and long term drifts will not affect the meter.

Although with the circuits so far described the amplifier 12 is desirable because of the heavy current drawn in charging the capacitor 15, it is possible to arrange for a high input impedance, so avoiding the need for amplifier 12, by replacing the amplifier 17 by a balanced amplifier 40. As shown in FIGURE 8 the capacitor 15 is now grounded and connected to one input 41 of the amplifier through the resistor 16. To this input are also connected the resistor 26 and the feedback input by way of the capacitor 19. The other input 42 of the amplifier is switched alternately between the input potential $V_1$ and earth.

The circuit shown in FIGURE 8 is particularly useful in converting the output of a variable reluctance transducer to digital form. With care in design the electromagnetic circuits of such transducers may be made to reproduce a square wave excitation with fair accuracy. The transducer output can then be connected direct to the input 42 of the amplifier 40 and the switch 13 is not required. Although the square wave transducer output may exhibit a slight droop, this merely introduces a scaling factor which is constant for a given type of transducer, and may accordingly be allowed for in calibration. Furthermore, the measurement is an A.C. measurement so that the reference voltage $V_{REF}$ does not have to be a direct voltage. Instead it may be replaced by the exciting square wave voltage of the transducer so that the meter becomes a direct reading ratiometer, intrinsically independent of the amplitude of the exciting voltage. An alternative way of obtaining high input impedance is to make the whole meter floating, which is perfectly practicable with a transistorised construction and a high frequency power supply and by connecting the input in series between the capacitor 15 and the resistor 16, the left hand side of the capacitor 15 (in FIG. 1) being earthed.

Other arrangements for transferring the input charge to the voltmeter may be made. Thus complete isolation from earth may be effected with or without polarity reversal by switching both poles of a charged capacitor from the input voltage to the amplifier. Also voltage division may be effected by sharing the charge between an input capacitor, whether this is switched on one or both of its poles, and a second calibrating capacitor.

A number of circuits of the kind described can be used in combination in a data logging system. In such a system a large number of inputs, for example 100, are successively connected by means of a tree of relays to a single voltage measuring and recording device. Fast counters for use in counting the clock pulses and giving the digital output have now been developed to such a speed that they do not represent the ultimate limit on the speed with which the multiple inputs may be scanned. The limit is set rather by the switching time of the relay tree.

In this respect the present invention enables an increase of speed to be made, since with a circuit such as is shown in FIGURE 8 for example, the charge transfer is initiated by breaking a pair of contacts. The action of breaking a relay contact pair is much faster than that of making and is not subject to bounce. Furthermore as discussed in connection with FIGURES 1 and 4, it is generally possible to allow a little delay before initiating the ramp. The relay tree may accordingly be designed to switch the inputs cycle not to a single voltage meter but to a plurality of voltage meters which are nevertheless considerably less in number than the number of inputs to be scanned. For example, 10 volt meters may be used in conjunction with 100 inputs, the first ten of which are switched in succession to the ten voltmeters, the second ten of which are then switched in succession to the same ten meters in the same order and so on.

Obviously in all figures polarities may be inverted and the various rectifiers reversed.

We claim:

1. In a digital voltmeter of the type which includes an operational amplifier, capacitive feedback means coupled to the amplifier, means for feeding a reference current to the amplifier input, a source of clock pulses, means for counting the clock pulses, and comparator means connected to the amplifier output for terminating the counting of clock pulses when the amplifier output level reaches a certain potential level, the improvement comprising: first means for initially switching into the amplifier input a charge proportional to a voltage to be measured to cause the amplifier output level to deviate from one reference signal level, said first means being coupled between the amplifier input and the source providing the voltage to be measured, and second means for subsequently causing said reference current to be fed into the amplifier input and for simultaneously initiating the counting of said clock pulses which are received by the counting means, said comparator means terminating the counting of clock pulses when the amplifier output level returns to said one reference signal level.

2. A digital voltmeter acrording to claim 1, further comprising a delay circuit which is coupled between the amplifier output and the comparator.

3. A digital voltmeter according to claim 2, wherein the delay circuit includes a diode connected to render the delay circuit inoperative when said reference current is fed into the amplifier-input.

4. A digital voltmeter according to claim 1, wherein the amplifier has a single input and wherein the said first means comprise an input capacitor, and a changeover switch coupled to the amplifier input through the input capacitor, the changeover switch being adapted to connect the capacitor alternately to earth and to the input voltage.

5. A digital voltmeter according to claim 4, comprising a D.C. amplifier preceding the changeover switch.

6. A digital voltmeter according to claim 4, comprising an A.C. amplifier connected between the changeover switch and the input capacitor.

7. A digital voltmeter according to claim 4, comprising further switch means effective to short-circuit the said operational amplifier output to the input thereof when the said changeover switch connects the input capacitor to earth.

8. A digital voltmeter according to claim 1, further comprising a unidirectional switch which is connected between the input and output of the operational amplifier.

9. A digital voltmeter according to claim 1, further comprising a high resistance and a source of fixed potential connected to the input of the operational amplifier through the high resistance.

10. A digital voltmeter according to claim 1, wherein the operational amplifier has first and second balanced inputs and further comprising a grounded input capacitor connected to the first input, said second means and said capacitive feedback means also being connected to the first input, and wherein the said first means comprises a changeover switch connected to the second input and adapted to connect the second input alternately to earth and the input voltage.

11. In a digital voltmeter of the type comprising an operational amplifier, capacitive feedback means coupled to the amplifier, means for feeding a reference current to the amplifier input, a source of clock pulses, means for counting the clock pulses, and comparator means connected to the amplifier output for terminating the counting of clock pulses when the amplifier output level reaches a certain level, the improvement comprising first means for initially feeding into the amplifier a charge proportional to a voltage to be measured to cause the amplifier output level to deviate from virtual earth, second means for subsequently causing said reference current to be fed into the amplifier input and for simultaneously initiating counting of said clock pulses, said comparator being constructed to terminate the counting of clock pulses when the amplifier output level returns to virtual earth, a unidirectional switch included in the amplifier feedback path between the amplifier output and the capacitive means, and a current sink connected to the amplifier output through the unidirectional switch.

12. In a digital voltmeter of the type comprising an operational amplifier, capacitive feedback means coupled to the amplifier, means for feeding a reference current to the amplifier input, a source of clock pulses, means for counting the clock pulses and comparator means connected to the amplifier output for terminating the counting of clock pulses when the amplifier output level reaches a certain level, the improvement comprising first means for initially feeding into the amplifier a charge proportional to a voltage to be measured to cause the amplifier output level to deviate from virtual earth, second means for subsequently causing said reference current to be fed into the amplifier input and for simultaneously initiating counting of said clock pulses, said comparator being constructed to terminate the counting of clock pulses when the amplifier output level returns to virtual earth, a diode included in the amplifier feedback path between the amplifier output and the capacitive means, and a current sink connected to the amplifier output through the diode.

13. In a digital voltmeter of the type comprising an operational amplifier, capacitive feedback means coupled to the amplifier, means for feeding a reference current to the amplifier input, a source of clock pulses, means for counting the clock pulses and comparator means connected to the amplifier output for terminating the counting of clock pulses when the amplifier output level reaches a certain level, the improvement comprising a unidirectional switch included in the amplifier feedback path between the amplifier output and the capacitive means, and a current sink connected to the amplifier output through the unidirectional switch.

14. A digital voltmeter according to claim 13, wherein the current sink comprises a source of a first potential and a resistor connected between the junction of the unidirectional switch and the capacitive means, and further comprising a second unidirectional switch and a source of a second potential, different from the first potential, connected to said junction through said unidirectional switch.

15. A digital voltmeter according to claim 14, wherein both said unidirectional switches are diodes.

16. In a digital voltmeter of the type comprising an operational amplifier, capacitive feedback means coupled to the amplifier, means for feeding a reference current to the amplifier input, a source of clock pulses, means for counting the clock pulses, and comparator means connected to the amplifier output for terminating the counting of clock pulses when the amplifier output level reaches a certain level, the improvement comprising a diode included in the amplifier feedback path between the amplifier output and the capacitive means, and a current sink connected to the amplifier output through the diode.

17. A digital voltmeter according to claim 16, wherein the diode is a silicon diode.

18. In a digital voltmeter, an integrating circuit having an input and an output and comprising an operational amplifier with capacitance feedback, a voltage signal source and a voltage reference source for supplying a reference signal to the integrating circuit input or opposite polarity to that of the input signal received at the integrating circuit input from said signal source, switching means coupled to said integrating circuit input, said switching means establishing an initial signal level at the integrating circuit output and being operable to apply a charge proportional to the input signal to said integrating circuit input whereupon the integrating circuit output level departs from said initial signal level and crosses a reference signal level, means for time delaying the supplying of said reference signal to said integrating circuit input after said switching means applies the input signal to said integrating circuit input for a time interval which is independent of the level of the integrating circuit output, following the crossing thereof of said reference level, whereupon a second output signal is subsequently produced at said integrating circuit output which is directed to return to said reference level and has a value proportional to the time integral of the reference signal supplied to said integrating circuit input by said reference source, and means coupled to said integrating circuit output for providing a digital representation of the time interval between the supplying of the reference signal to said integrating circuit input and the subsequent return of the second output signal to said reference level.

19. An electrical measuring apparatus of a type wherein a first input signal of unknown magnitude and thereafter a second input signal of constant magnitude and of opposite polarity to the first input signal is applied to the input of an integrating circuit, said integrating circuit comprising an operational amplifier and a feedback circuit which includes an integrating capacitor, and further wherein the time required to integrate the second signal to a predetermined signal level is clocked to provide a digital representation of the magnitude of said first input signal, the apparatus comprising, switch means coupled to the input of said integrating circuit for connecting said first input signal to said integrating circuit input and for disconnecting the operational amplifier output from the integrating circuit input so as to permit the departure of the integrating circuit output potential from one potential level established by the operational amplifier, second means for supplying said second input signal to said integrating circuit when said first integrating circuit output potential attains a level which represents the value of the first input signal and at least after said first integrating circuit output departs from said one potential level and crosses a reference signal level equal to said predetermined signal level, and third means coupled to the integrating circuit output and responsive to the integrated second signal returning to said reference level for providing a digital representation of said first input signal magnitude.

20. The apparatus as claimed in claim 19 wherein the first signal is supplied to said integrating circuit from a first signal source and wherein said switching circuit means selectively connects said integrating circuit to said first signal source and said integrating circuit output to the input of said operational amplifier.

21. The apparatus as claimed in claim 19 wherein said third means comprises, a bistable signal level detector responsively coupled to the output of said integrating circuit, said detector producing an enabling signal in response to the crossing of said first signal of said reference signal level and producing a disabling signal in response to said second signal returning to said reference signal level, a clock pulse source and a counter for counting clock pulses received from said clock pulse source, and pulse gating means coupled to said level detector, to said clock pulse source and said counter, said gating means being enabled by a detector enabling signal to transmit clock pulses from said clock pulse source to said counter and being disabled by a detector disabling signal to terminate pulse transmission between said clock source and said counter.

22. In a digital voltmeter, an integrating circuit having an input and an output and comprising an operational amplifier with capacitance feedback, a voltage signal source and a constant voltage reference source of opposite polarity to that of the input signal received at the integrating circuit input from said signal source, a source of clock pulses and a pulse counter for providing a digital representation of the number of pulses received from the clock source, a first switching device coupled to said integrating circuit input for selectively applying the input signal to said circuit input, a circuit for selectively shunting the integrating circuit output to the integrating circuit input, the shunting circuit when opened allowing said integrating circuit to produce a first output signal which departs in one direction from ground potential established by the prior closure of said shunting circuit, means coupled to said integrating circuit output responsive to the departure of said first output signal in said one direction from a reference level for initiating the counting of clock pulses by said counter and for terminating the counting of clock pulses by said counter when the level of the signal at said integrating circuit output returns to said reference level, and means for connecting said reference source to said integrating circuit input after said first signal departs from said reference level whereby a second output signal is produced at said integrating circuit output which is directed to return to said reference level and has a magnitude proportional to the time integral of the reference signal supplied to said integrating circuit input by said reference source, the number of pulses counted by said counter from the time the reference source is connected to said integrating circuit input to the termination of clock pulse counting providing a digital representation of the input signal magnitude.

References Cited

UNITED STATES PATENTS

| | | | |
|---|---|---|---|
| 2,710,397 | 6/1955 | Foster | 324—111 |
| 2,713,135 | 7/1955 | Macklem | 324—111 |
| 3,140,470 | 7/1964 | Chase | 324—111 |
| 3,188,455 | 6/1965 | Quick | 340—347 |
| 3,237,190 | 2/1966 | Summers | 340—347 |
| 3,287,723 | 11/1966 | Metcalf | 340—347 |

RUDOLPH V. ROLINEC, *Primary Examiner.*

E. F. KARLSEN, *Assistant Examiner.*

U.S. Cl. X.R.

324—111; 340—347

U.S. DEPARTMENT OF COMMERCE
PATENT OFFICE
Washington, D.C. 20231

UNITED STATES PATENT OFFICE
CERTIFICATE OF CORRECTION

Patent No. 3,439,271                              April 15, 1969

Eric Metcalf et al.

It is certified that error appears in the above identified patent and that said Letters Patent are hereby corrected as shown below:

Column 8, line 58, "operational amplifier" should read -- integrating circuit --; line 59, "integrating circuit" should read -- operational amplifier --.

Signed and sealed this 21st day of April 1970.

(SEAL)
Attest:

Edward M. Fletcher, Jr.                    WILLIAM E. SCHUYLER, JR
Attesting Officer                             Commissioner of Patents